(12) United States Patent
Hu et al.

(10) Patent No.: US 11,563,963 B2
(45) Date of Patent: Jan. 24, 2023

(54) DETERMINING WHETHER TO CODE PICTURE HEADER DATA OF PICTURES OF VIDEO DATA IN SLICE HEADERS

(71) Applicant: QUALCOMM Incorporated, San Diego, CA (US)

(72) Inventors: Nan Hu, San Diego, CA (US); Vadim Seregin, San Diego, CA (US); Yong He, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/322,510

(22) Filed: May 17, 2021

(65) Prior Publication Data

US 2021/0368192 A1 Nov. 25, 2021

Related U.S. Application Data

(60) Provisional application No. 63/029,191, filed on May 22, 2020, provisional application No. 63/027,055, filed on May 19, 2020.

(51) Int. Cl.
*H04N 19/44* (2014.01)
*H04N 19/117* (2014.01)
(Continued)

(52) U.S. Cl.
CPC .......... *H04N 19/44* (2014.11); *H04N 19/117* (2014.11); *H04N 19/159* (2014.11);
(Continued)

(58) Field of Classification Search
CPC ..... H04N 19/44; H04N 19/117; H04N 19/159
(Continued)

(56) References Cited

U.S. PATENT DOCUMENTS

2012/0082244 A1* 4/2012 Chen ............... H04N 19/82
375/E7.189
2012/0207227 A1* 8/2012 Tsai ................ H04N 19/174
375/E7.194
(Continued)

FOREIGN PATENT DOCUMENTS

CN 102857746 B 3/2017
JP 2018029389 A 2/2018
(Continued)

OTHER PUBLICATIONS

International Search Report and Written Opinion—PCT/US2021/032968—ISA/EPO—dated Oct. 4, 2021, 18 pp.
(Continued)

*Primary Examiner* — Amir Shahnami
(74) *Attorney, Agent, or Firm* — Abhishek Rastogi

(57) ABSTRACT

An example device for decoding video data, the device including a memory configured to store video data; and one or more processors implemented in circuitry and configured to: determine that adaptive loop filter (ALF) information can be present in a picture header of a picture of the video data and cannot be present in a slice header; in response to determining that the ALF information can be present in the picture header and cannot be present in the slice header, determine that a picture header syntax structure is not present in the slice header (e.g., without decoding data representing a value for a syntax element indicating whether the picture header syntax structure is present in the slice header); and decode the picture according to the determination that the picture header syntax structure is not present in the slice header.

34 Claims, 6 Drawing Sheets

(51) Int. Cl.
  *H04N 19/82* (2014.01)
  *H04N 19/174* (2014.01)
  *H04N 19/46* (2014.01)
  *H04N 19/159* (2014.01)
  *H04N 19/169* (2014.01)
  *H04N 19/70* (2014.01)

(52) U.S. Cl.
  CPC ......... *H04N 19/174* (2014.11); *H04N 19/188* (2014.11); *H04N 19/46* (2014.11); *H04N 19/70* (2014.11); *H04N 19/82* (2014.11)

(58) Field of Classification Search
  USPC .................................................. 375/240.25
  See application file for complete search history.

(56) References Cited

U.S. PATENT DOCUMENTS

| 2021/0136419 | A1 | 5/2021 | Hsiang |
| 2021/0306672 | A1* | 9/2021 | Bossen ............... H04N 19/176 |
| 2021/0360289 | A1 | 11/2021 | He et al. |

FOREIGN PATENT DOCUMENTS

| WO | 2021022264 | A1 | 2/2021 |
| WO | 2021045491 | A1 | 3/2021 |
| WO | 2021045658 | A2 | 3/2021 |
| WO | 2021143177 | A1 | 7/2021 |

OTHER PUBLICATIONS

Bross B., et al., "Versatile Video Coding (Draft 9)", 130. MPEG Meeting, Apr. 20, 2020-Apr. 24, 2020, Alpbach, 18th JVET Meeting, Apr. 15, 2020-Apr. 24, 2020 (Motion Picture Expert Group or ISO/IEC JTC1/SC29/WG11) No. JVET-R2001-vA, m53983, JVET-R2001, May 15, 2020 (May 15, 2020), 528 Pages, XP030287936, Retrieved from the Internet: URL: http://phenix.int-evry.fr/mpeg/doc_end_user/documents/130_Alpbach/wg11/m53983-JVET-R2001-v10-JVET-R2001-vA.zip JVET-R2001-vA.docx [retrieved on May 15, 2020].

Bross B., et al., "Versatile Video Coding (Draft 8)", Joint Video Experts Team (JVET) of ITU-T SG 16 WP 3 and ISO/IEC JTC 1/SC 29/WG 11, 17th Meeting, Brussels, BE, Jan. 7-17, 2020, JVET-Q2001-vA, 519 Pages.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016, XP030150000, 27 Pages, URL: http://phenix.int-evry.fr/jvet/.

Hu (Qualcomm) N., et al., "AHG9: Constraints on sh_Picture_Header_in_Slice_Header_Flag", Joint Video Experts Team (JVET), of ITU-T SG 16 WP 3 and ISO/IEC JTC 1/SC 29/WG 11, JVET-S0120, 19th Meeting: by teleconference, Jun. 22-Jul. 1, 2020, pp. 1-2.

ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.

Partial International Search Report—PCT/US2021/032968—ISA/EPO—dated Jul. 15, 2021, 14 pp.

Pettersson (Ericsson) M., et al., "AHG9: Fixes Related to the Picture Header" 130. MPEG Meeting, Apr. 20, 2020-Apr. 24, 2020, Alpbach, (Motion Picture Expert Group or ISO/IEC JTC1/SC29/WG11), No. m53228, JVET-R0251, Apr. 3, 2020, XP030286292, pp. 1-4, Retrieved from the Internet: URL:http://phenix.int-evry.fr/mpeg/doc_end_user/documents/130_Alpbach/wg11/m53228-JVET-R0251-v1-JVET-R0251-v1.zip JVET-R0251.docx [retrieved on Apr. 3, 2020].

Wang Y-K (Bytedance): "AHG9: A Summary of Proposals on Syntax for One Slice Per Picture", 130. MPEG Meeting, Apr. 20, 2020-Apr. 24, 2020, Alpbach, (Motion Picture Expert Group or ISO/IEC JTC1/SC29/WG11) No. m53741, JVET-R0406-V7, Apr. 12, 2020, XP030287480, pp. 1-7, Retrieved from the Internet: URL:http://phenix.int-evry.fr/mpeg/doc_end_user/documents/130_Alpbach/wg11/m53741-JVET-R0406-v7-JVET-R0406-v7.zip JVET-R0406-v7.docx [retrieved on Apr. 12, 2020].

Bross B., et al., "Developments in International Video Coding Standardization After AVC, with an Overview of Versatile Video Coding (VVC)", Proceedings of the IEEE, vol. 109, No. 9, Sep. 2021, pp. 1463-1493.

Bross B., et al., "Versatile Video Coding (Draft 8)," 17. JVET Meeting, Jan. 7, 2020-Jan. 17, 2020, Brussels, BE, (The Joint Video Experts Team of ISO/IEC JTC1/SC29/WG11 and ITU-TSG.16 WP 3), No. JVET-Q2001-vD, Feb. 27, 2020 (Feb. 27, 2020), XP030285389, 514 Pages, Cited in the application p. 95, Section ols_mode_idc, pp. 108 (definition of sps_affine_enabled_flag andfive_minus_max_num_subblock_merge_cand) and p. 124 (equation (87)—with the lines immediately before and after it).

Certified Copy of U.S. Appl. No. 62/960,134, filed Jan. 12, 2020, 173 pages.

Sullivan G., et al., "Meeting Report of the 19th Meeting of the Joint Video Experts Team (JVET), by Teleconference, Jun. 22-Jul. 1, 2020", JVET-S_Notes_dC, Joint Video Experts Team (JVET) of ITU-T SG 16 WP 3 and ISO/IEC JTC 1/SC 29/WG 11 19th Meeting, by Teleconference, Jun. 22-Jul. 1, 2020, pp. 1-240.

Sullivan G., et al., "Meeting Report of the 17th Meeting of the Joint Video Experts Team (JVET), Brussels, BE, Jan. 7-17, 2020", JVET-Q2000-v1, Joint Video Experts Team (JVET) of ITU-T SG 16 WP 3 and ISO/IEC JTC 1/SC 29/WG 11 17th Meeting: Brussels, BE, Jan. 7-17, 2020, pp. 1-380.

Wang Y.K., et al., "The High-Level Syntax of the Versatile Video Coding (VVC) Standard", IEEE Transactions on Circuits and Systems for Video Technology, vol. 31, No. 10, Oct. 2021, pp. 3779-3880.

* cited by examiner

DETERMINING WHETHER TO CODE PICTURE HEADER DATA OF PICTURES OF VIDEO DATA IN SLICE HEADERS

This application claims the benefit of U.S. Provisional Application No. 63/027,055, filed May 19, 2020, and of U.S. Provisional Application No. 63/029,191, filed May 22, 2020, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for determining whether picture header syntax structures can be coded in slice headers of slices of a picture. In particular, according to the techniques of this disclosure, a video coder may avoid coding picture header syntax structures in slice headers of a picture when ALF information can be coded in the picture header (and not coded in slice headers). Additionally, this disclosure describes techniques for determining whether a picture can be used as a reference picture according to whether the picture is predicted entirely using intra-prediction.

In one example, a method of decoding video data includes determining that adaptive loop filter (ALF) information can be present in a picture header of a picture and cannot be present in a slice header; in response to determining that the ALF information can be present in the picture header and cannot be present in the slice header, determining that a picture header syntax structure is not present in the slice header (e.g., without decoding data representing a value for a syntax element indicating whether the picture header syntax structure is present in the slice header); and decoding the picture according to the determination that the picture header syntax structure is not present in the slice header.

In another example, a device for decoding video data includes a memory configured to store video data; and one or more processors implemented in circuitry and configured to: determine that adaptive loop filter (ALF) information can be present in a picture header of a picture of the video data and cannot be present in a slice header; in response to determining that the ALF information can be present in the picture header and cannot be present in the slice header, determine that a picture header syntax structure is not present in the slice header (e.g., without decoding data representing a value for a syntax element indicating whether the picture header syntax structure is present in the slice header); and decode the picture according to the determination that the picture header syntax structure is not present in the slice header.

In another example, a computer-readable storage medium has stored thereon instructions that, when executed, cause a processor to: determine that adaptive loop filter (ALF) information can be present in a picture header of a picture and cannot be present in a slice header; in response to determining that the ALF information can be present in the picture header and cannot be present in the slice header, determine that a picture header syntax structure is not present in the slice header (e.g., without decoding data representing a value for a syntax element indicating whether the picture header syntax structure is present in the slice header); and decode the picture according to the determination that the picture header syntax structure is not present in the slice header.

In another example, a device for decoding video data includes means for determining that adaptive loop filter (ALF) information can be present in a picture header of a picture and cannot be present in a slice header; means for determining, in response to determining that the ALF information can be present in the picture header and cannot be present in the slice header, that a picture header syntax structure is not present in the slice header (e.g., without decoding data representing a value for a syntax element indicating whether the picture header syntax structure is present in the slice header); and means for decoding the picture according to the determination that the picture header syntax structure is not present in the slice header.

The details of one or more examples are set forth in the accompanying drawings and the description below. Other features, objects, and advantages will be apparent from the description, drawings, and claims.

DETAILED DESCRIPTION

Figure 1:
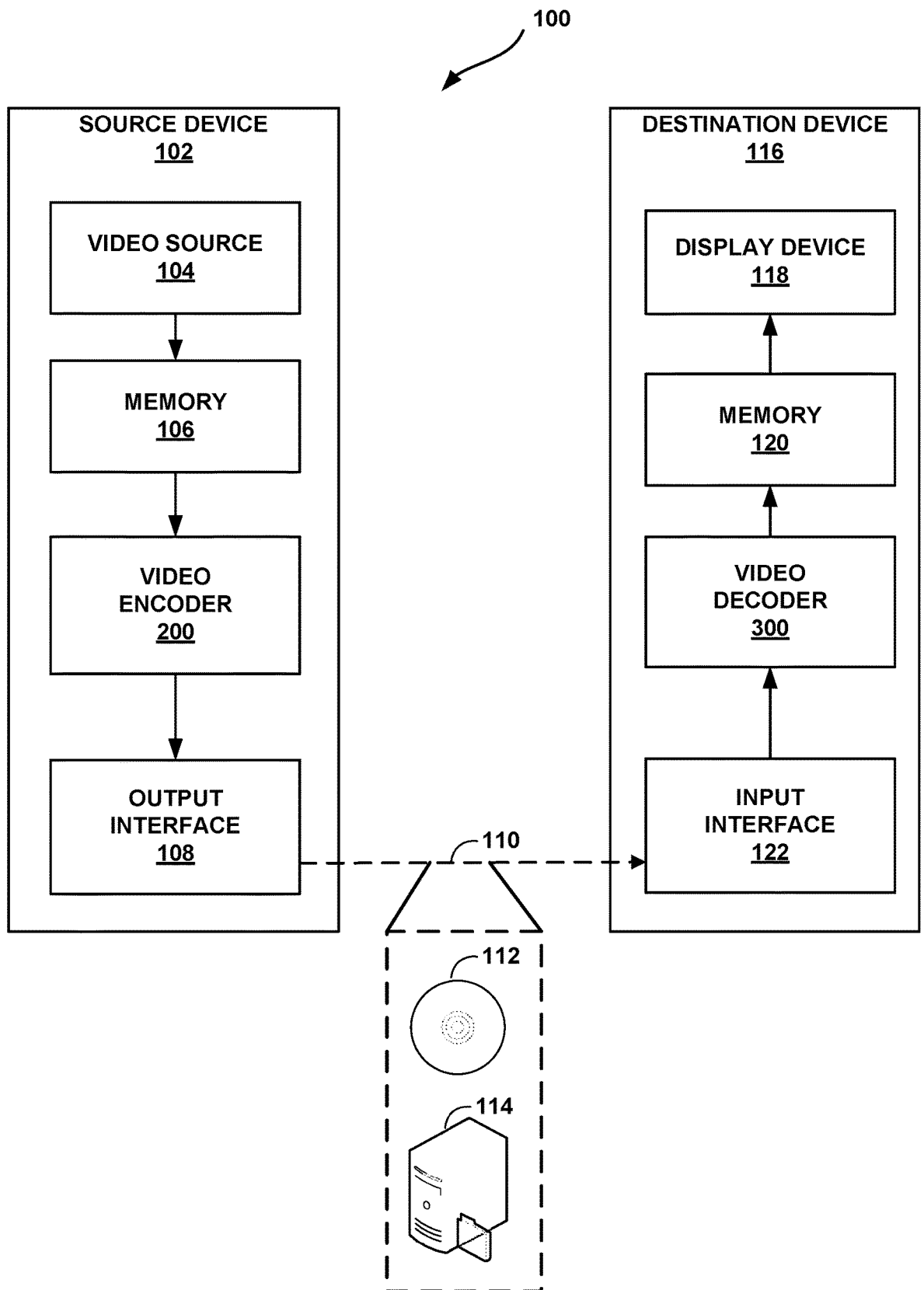
FIG. 1 is a block diagram illustrating an example video encoding and decoding system that may perform the techniques of this disclosure.

Video coding generally includes coding of individual pictures of video data. Pictures may be partitioned into slices, which may further be partitioned into blocks of video data. Pictures and slices may also include respective headers, which include metadata for the corresponding pictures or slices. In Versatile Video Coding (VVC) Draft 9 (Joint Video Experts Team (WET) of ITU-T SG 16 WP 3 and ISO/IEC JTC 1/SC 29/WG 11, 18th meeting, 15-24 Apr. 2020, Document WET-R2001-vA, available at phenix.it-sudparis.eu/jvet/doc end user/current document.php?id=10155), a syntax element (sh_picture_header_in_slice_header_flag) may have a value indicating whether a picture header can be present in a slice header. In the example of VVC Draft 9, if the value of the syntax element is true, a picture header is present in a slice header; otherwise (if the value of the syntax element is false), the picture header is not present in the slice header.

Furthermore, according to VVC Draft 9, when any of the following conditions is true, the value of sh_picture_header_in_slice_header_flag shall be equal to zero:

The value of sps_subpic_info_present_flag is equal to 1.
The value of sps_separate_colour_plane_flag is equal to 1.
The value of pps_rect_slice_flag is equal to 0.
The value of pps_rpl_info_in_ph_flag, pps_dbf_info_in_ph_flag, pps_sao_info_in_ph_flag, pps_wp_info_in_ph_flag, or pps_qp_delta_info_in_ph_flag is equal to 1.

In VVC Draft 9, a flag called pps_no_pic_partition_flag of a picture parameter set (PPS) having a value equal to 1 specifies that no picture partitioning is applied to each picture referring to the PPS. The flag pps_no_pic_partition_flag having a value equal to 0 specifies that each picture referring to the PPS may be partitioned into more than one tile or slice.

In VVC Draft 9, a general constraint information flag intra_only_constraint_flag having a value equal to 1 specifies that sh_slice_type shall be equal to I. The flag intra only constraint flag having a value equal to 0 does not impose such a constraint. When general_one_picture_only_constraint_flag is equal to 1, the value of intra_only_constraint_flag shall be equal to 1.

In VVC Draft 9, a flag of a PPS, pps_output_flag_present_flag, having a value equal to 1 specifies that the ph_pic_output_flag syntax element is present in picture headers referring to the PPS. The flag pps_output_flag_present_flag having a value equal to 0 specifies that the ph_pic_output_flag syntax element is not present in picture headers referring to the PPS.

In VVC Draft 9, a flag of a picture header, ph_non_reference_picture_flag, having a value equal to 1 specifies that a picture associated with the picture header is never used as a reference picture. The flag ph_non_reference_picture_flag having a value equal to 0 specifies that the picture associated with the picture header may or may not be used as a reference picture.

A picture header per VVC Draft 9 may include the following elements:

| |
|---|
| if( pps_output_flag_present_flag && !ph nonreferencepicture _flag ) |
| ph_pic_output_flag  u(1) |

The flag ph_pic_output_flag affects the decoded picture output and removal processes as specified in Annex C of VVC Draft 9. When ph_pic_output_flag is not present, it is inferred to have a value equal to 1, per VVC Draft 9. When pps_output_flag_present_flag has a value of 0, ph_pic_output_flag is inferred to have a value equal to 1.

This disclosure recognizes that when picture partitioning is disabled (e.g., the flag pps_no_pic_partition_flag has a value equal to 1), a picture header can be present in a slice header, and there is no need to restrict sh_picture_header_in_slice_header_flag to be 0. This disclosure also recognizes that when adaptive loop filter (ALF) information is signalled in a picture header (e.g., pps_alf_info_in_ph_flag has a value equal to 1), a picture header shall be not be in a slice header. This disclosure further recognizes that if a picture is intra-only coded (e.g., intra_only_constraint_flag has a value equal to 1), no picture will be used as reference, and thus, there is no need to signal values for ph_non_reference_picture_flag and ph_pic_output_flag.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for determining whether to code picture header syntax structures in slice headers and determining whether to use pictures as reference pictures. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for determining whether to code picture header syntax structures in slice headers and determining whether to use pictures as reference pictures. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as Versatile Video Coding (VVC). A recent draft of the VVC standard is described in Bross, et al. "Versatile Video Coding (Draft 8)," Joint Video Experts Team (WET) of ITU-T SG 16 WP 3 and ISO/IEC JTC 1/SC 29/WG 11, 17$^{th}$ Meeting: Brussels, BE, 7-17 Jan. 2020, JVET-Q2001-vA (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may be configured to skip/omit coding of a syntax element indicating whether picture header syntax structures can be included in slice headers for a picture under certain conditions. In one example, when picture partitioning into subpictures/slice is disabled (e.g., when a pps_no_pic_partition_flag of a PPS to which the picture refers has a value equal to 1), a picture header syntax structure may always be in a slice header or may always be out of a slice header (a picture header may be present in a picture header NAL unit) without signaling a flag to indicate this. That is, video encoder 200 and video decoder 300 may determine that the value of the syntax element sh_picture_header_in_slice_header_flag is not coded as part of the bitstream and may instead infer a value for this syntax element.

The specification of VVC Draft 9 may be changed as follows, to reflect the change discussed above (where "[added: "added text"]" represents additions relative to VVC Draft 9:

| | |
|---|---|
| [added: "if(!pps_no_pic_partition_flag)"] sh_picture_header_in_slice_header flag | u(1) | sh_picture_header_in_slice_header_flag equal to 1 specifies that the PH syntax structure is present in the slice header. sh_picture_header_in_slice_header_flag equal to 0 specifies that the PH syntax structure is not present in the slice header. [added: "When not present, it is inferred to be equal 0. (Alternatively, when not present, it is infered to be equal 1)"].

In some examples, video encoder 200 and video decoder 300 may infer that, when picture partitioning into subpictures/slices is allowed, sh_picture_header_in_slice_header_flag is equal to 0 when any of the following conditions is true:

The value of sps_subpic_info_present_flag is equal to 1.
The value of sps_separate_colour_plane_flag is equal to 1.
The value of pps_rect_slice_flag is equal to 0.
The value of pps_rpl_info_in_ph_flag, pps_dbf_info_in_ph_flag, pps_sao_info_in_ph_flag, pps_wp_info_in_ph_flag, or pps_qp_delta_info_in_ph_flag is equal to 1.

The specification of VVC Draft 9 may be modified as follows to reflect this example change:

When any of the following conditions is true [added: "and pps_no_pic_partition_flag is equal to 0"], the value of sh_picture_header_in_slice_header_flag shall be equal to 0:
- The value of sps_subpic_info_present_flag is equal to 1.
- The value of sps_separate_colour_plane_flag is equal to 1.
- The value of pps_rect_slice_flag is equal to 0.
- The value of pps_rpl_info_in_ph_flag, pps_dbf_info_in_ph_flag, pps_sao_info_in_ph_flag, pps_wp_info_in_ph_flag, or pps_qp_delta_info_in_ph_flag is equal to 1.

Alternatively, one or more itemized above conditions may be combined with pps_no_pic_partition_flag is equal to 0. For example:

When any of the following conditions is true, the value of sh_picture_header_in_slice_header_flag shall be equal to 0:
- The value of sps_subpic_info_present_flag is equal to 1 [added: "and pps_no_pic_partition_flag is equal to 0"].
- The value of sps_separate_colour_plane_flag is equal to 1.
- The value of pps_rect_slice_flag is equal to 0 [added: "and pps_no_pic_partition_flag is equal to 0"].
- The value of pps_rpl_info_in_ph_flag, pps_dbf_info_in_ph_flag, pps_sao_info_in_ph_flag, pps_wp_info_in_ph_flag, or pps_qp_delta_info_in_ph_flag is equal to 1 [added: "and pps_no_pic_partition_flag is equal to 0"].

As another example, any of the following conditions is true, the value of sh_picture_header_in_slice_header_flag shall be equal to 0:
- The value of sps_subpic_info_present_flag is equal to 1 [added: "and pps_no_pic_partition_flag is equal to 0"].
- The value of sps_separate_colour_plane_flag is equal to 1.
- The value of pps_rect_slice_flag is equal to 0.
- The value of pps_rpl_info_in_ph_flag, pps_dbf_info_in_ph_flag, pps_sao_info_in_ph_flag, pps_wp_info_in_ph_flag, or pps_qp_delta_info_in_ph_flag is equal to 1 [added: "and pps_no_pic_partition_flag is equal to 0"].

In some examples, when adaptive loop filter (ALF) information may be present in a picture header and not present in a slice header (e.g., pps_alf_info_in_ph_flag of a PPS to which a picture including the picture header refers) is equal to 1, the picture header syntax structure may not be present in the slice header (e.g., video encoder 200 and video decoder 300 may infer a value of 0 for sh_picture_header_in_slice_header_flag when not present, or the value of sh_picture_header_in_slice_header_flag shall be 0 when present). Thus, in some examples, the specification of VVC Draft 9 may be changed as follows: when any of the following conditions is true, the value of sh_picture_header_in_slice_header_flag shall be equal to 0:
- The value of sps_subpic_info_present_flag is equal to 1.
- The value of sps_separate_colour_plane_flag is equal to 1.
- The value of pps_rect_slice_flag is equal to 0.
- The value of pps_rpl_info_in_ph_flag, pps_dbf_info_in_ph_flag, pps_sao_info_in_ph_flag, pps_wp_info_in_ph_flag, [added: "pps_alf_info_in_ph_flag"], or pps_qp_delta_info_in_ph_flag is equal to 1.

In some examples, video encoder 200 and video decoder 300 may also determine that a picture cannot be used as a reference when all slices of the picture are intra slices (e.g., intra_only_constraint_flag has a value equal to 1). Video encoder 200 and video decoder 300 may also avoid storing such a picture in a decoded picture buffer (DPB), although video decoder 300 may still output the decoded picture. Additionally or alternatively, video encoder 200 and video decoder 300 may determine that a pps_output_flag_present_flag has a value of 0. Semantics of VVC Draft 9 may be changed as follows:

intra_only_constraint_flag equal to 1 specifies that sh_slice_type shall be equal to I. intra_only_constraint_flag equal to 0 does not impose such a constraint. When general_one_picture_only_constraint_flag is equal to 1, the value of intra_only_constraint_flag shall be equal to 1. [added: "When intra_only_constraint_flag is equal to 1, ph_non_reference_picture_flag shall be equal to 1. When intra_only_constraint_flag is equal to 1, pps_output_flag_present_flag shall be equal to 0. When intra_only_constraint_flag is equal to 1, ph_pic_output_flag shall be equal to 1."]

When pps_output_flag_present_flag is equal to 0, the output process may be applied to all pictures. Therefore, a picture cannot be used as a reference picture of other pictures. In this case, there is no need to signal ph_non_reference_picture_flag, and video encoder 200 and video decoder 300 can infer a value of 1 for ph_non_reference_picture_flag.

Syntax and semantics of VVC Draft 9 may be modified as follows:

| [added: "if (pps_output_flag_present_flag)"] ph_non_reference_picture_flag | u(1) |
|---|---| ph_non_reference_picture_flag equal to 1 specifies the picture associated with the PH is never used as a reference picture. ph_non_reference_picture_flag equal to 0 specifies the picture associated with the PH may or may not be used as a reference picture. When not present, ph_non_reference_picture_flag is inferred to be equal to 1.

Alternatively, when pps_output_flag_present_flag is equal to 0, ph_non_reference_picture_flag may be equal to 1. That is, VVC draft 9 may be modified as follows:

ph_non_reference_picture_flag equal to 1 specifies the picture associated with the PH is never used as a reference picture. ph_non_reference_picture_flag equal to 0 specifies the picture associated with the PH may or may not be used as a reference picture. [added: "When pps_output_flag_present_flag is equal to 0, ph_non_reference_picture_flag shall be equal to 1."]

The various example techniques discussed above may be performed alone or in any combination.

Figure 2A:
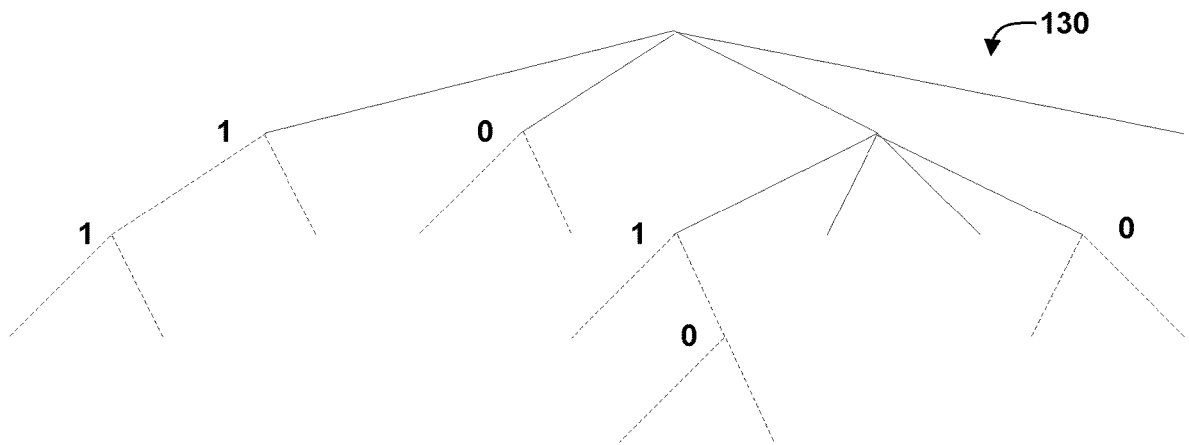
FIGS. 2A and 2B are conceptual diagrams illustrating an example quadtree binary tree (QTBT) structure, and a corresponding coding tree unit (CTU).
Figure 2B:
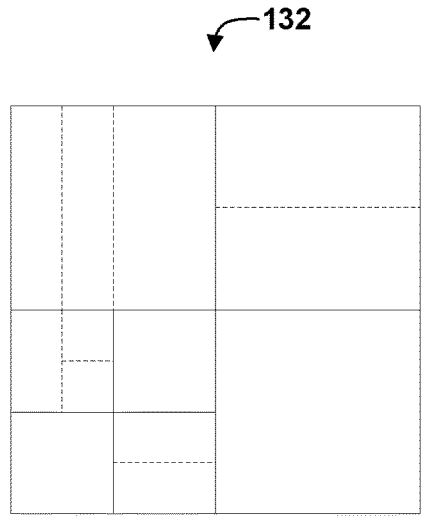

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), the nodes can be further partitioned by respective binary trees. The binary tree splitting of one node can be iterated until the nodes resulting from the split reach the minimum allowed binary tree leaf node size (MinBT-Size) or the maximum allowed binary tree depth (MaxBT-Depth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the quadtree leaf node will not be further split by the binary tree, since the size exceeds the MaxBTSize (i.e., 64×64, in this example). Otherwise, the quadtree leaf node may be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
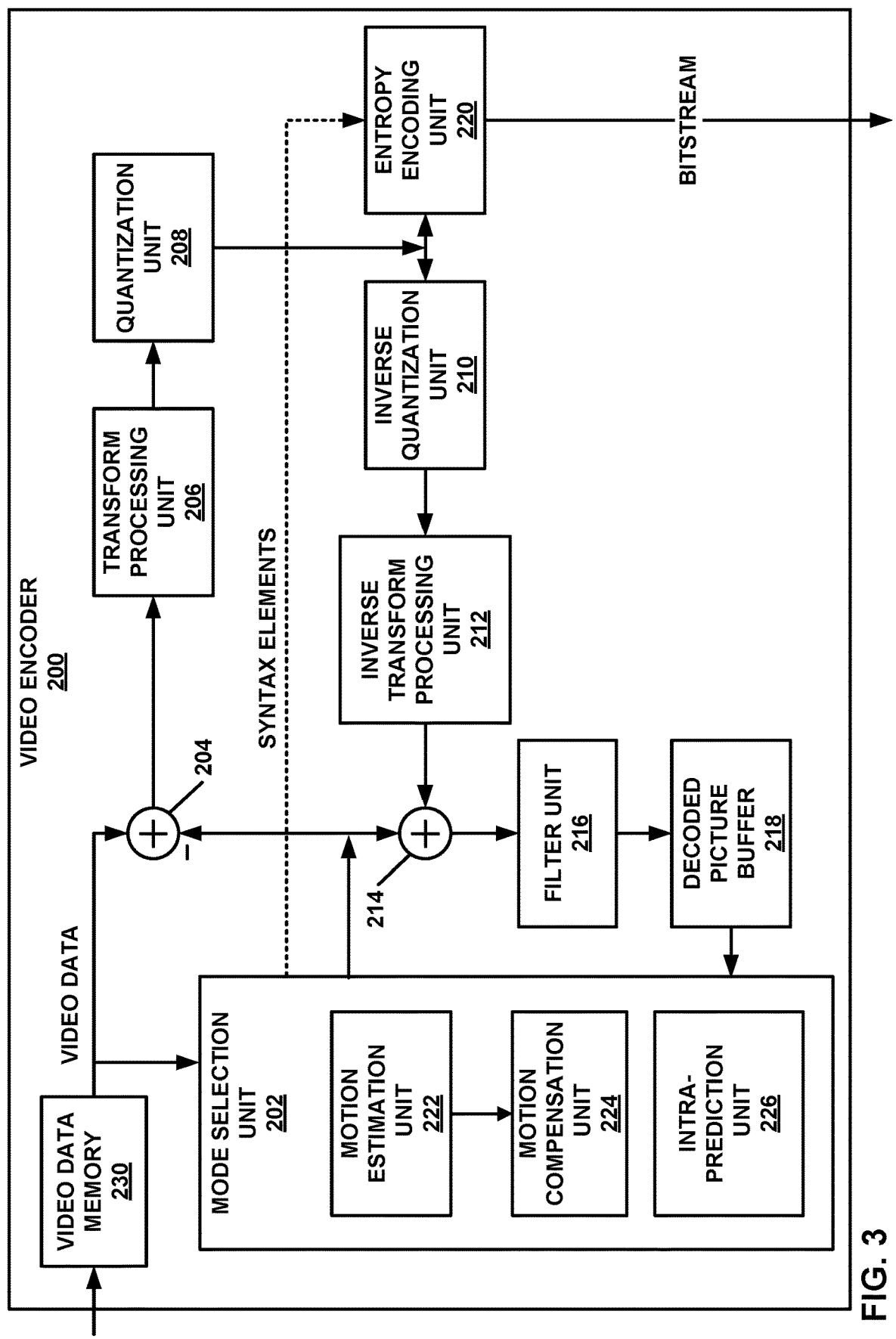
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to other video encoding and decoding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes motion estimation unit 222, motion compensation unit 224, and intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

In some examples according to the techniques of this disclosure, mode selection unit 202 may determine whether to include picture header information in a slice header of a slice of a picture. For example, adaptive loop filter (ALF) information may be the same for all slices of a picture. Thus, mode selection unit 202 may determine that the ALF information, along with other picture header information, can be signaled in a picture header of the picture, instead of in individual slice headers of the slices of the picture. In this manner, mode selection unit 202 may determine that ALF information can be present in a picture header of a picture and cannot be present in a slice header. Mode selection unit 202 may further signal that the ALF information can be present in the picture header and cannot be present in the slice header using a value of a syntax element, such as a pps_alf_info_in_ph_flag syntax element of a picture parameter set (PPS) to which the picture refers.

After determining that ALF information can be present in the picture header and cannot be present in a slice header, mode selection unit 202 may determine that video encoder 200 need not encode (e.g., signal) a value for a syntax element indicating whether picture header information is signaled in slice headers of slices of the picture. For example, mode selection unit 202 may determine that video encoder 200 may skip encoding of a value for a sh_picture_header_in_slice_header_flag syntax element. Similarly, mode selection unit 202 may determine that picture header information need not be coded in any of the slice headers, and thus, may cause video encoder 200 to avoid encoding picture header information in any of the slice headers of slices of the picture. Alternatively, the syntax element sh_picture_header_in_slice_header_flag may still be encoded, but the value shall be 0.

Mode selection unit 202 may further encode ALF information in the picture header. The ALF information may include, for example, ALF coefficients for the picture. As discussed in further detail below, mode selection unit 202 may cause filter unit 216 to apply the ALF information during filtering of decoded data for the picture (e.g., decoded blocks of the picture). Mode selection unit 202 may cause filter unit 216 to apply the same ALF information to the entire picture, e.g., all slices of the picture.

Mode selection unit 202 may also determine whether to enable partitioning of the picture into slices. For example, mode selection unit 202 may be configured with a maximum transmission unit (MTU) size for packets of a network. Mode selection unit 202 may determine whether encoded data for the picture has a size equal to or less than the MTU size, or other threshold value. When the size of the encoded data for the picture exceeds the MTU size or other threshold, mode selection unit 202 may enable partitioning of the picture into slices, such that encoded data for each slice is less than or equal to the MTU size or other threshold value. In either case (i.e., whether or not slices are enabled), according to the techniques discussed above, mode selection unit 202 may still prevent encoding of picture header information in slice headers of the slices. In this manner, sizes of the slices may be reduced, and redundantly signaled information (e.g., picture header information signaled in slice headers) may be avoided, which may reduce signaling overhead for the picture and for each slice of the picture (when slices are enabled). In some examples, mode selection unit 202 may cause video encoder 200 to encode a value for a syntax element, such as a pps_no_pic_partition_flag of a picture parameter set (PPS) to which the picture refers, to indicate whether partitioning of the picture into slices is enabled.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generates syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Entropy encoding unit 220 may be configured according to the techniques of this disclosure to encode picture header and slice header syntax structures for a picture. For example, a picture may include data referring to a corresponding picture parameter set (PPS). If the PPS includes a syntax element indicating that pictures referring to the PPS are not to be partitioned into sub-pictures or slices (e.g., pps_no_pic_partition_flag is equal to 1), entropy encoding unit 220 may avoid encoding a value for a syntax element specifying whether a picture header syntax structure is present in a slice header. Furthermore, entropy encoding unit 220 may either encode the picture header syntax structure in the slice header, or separate from the slice header, according to the inferred value for the omitted syntax element.

Additionally or alternatively, if a picture is coded with a constraint that all slices of the picture are intra slices, video encoder 200 may avoid using the picture as a reference picture. For example, video encoder 200 may avoid storing the picture in DPB 218. Likewise, video encoder 200 may ensure that the picture includes a PPS identifier for a PPS for which pps_output_flag_present_flag is equal to zero. Accordingly, entropy encoding unit 220 may avoid coding (i.e., omit coding) values for ph_non_reference_picture_flag and ph_pic_output_flag.

Figure 4:
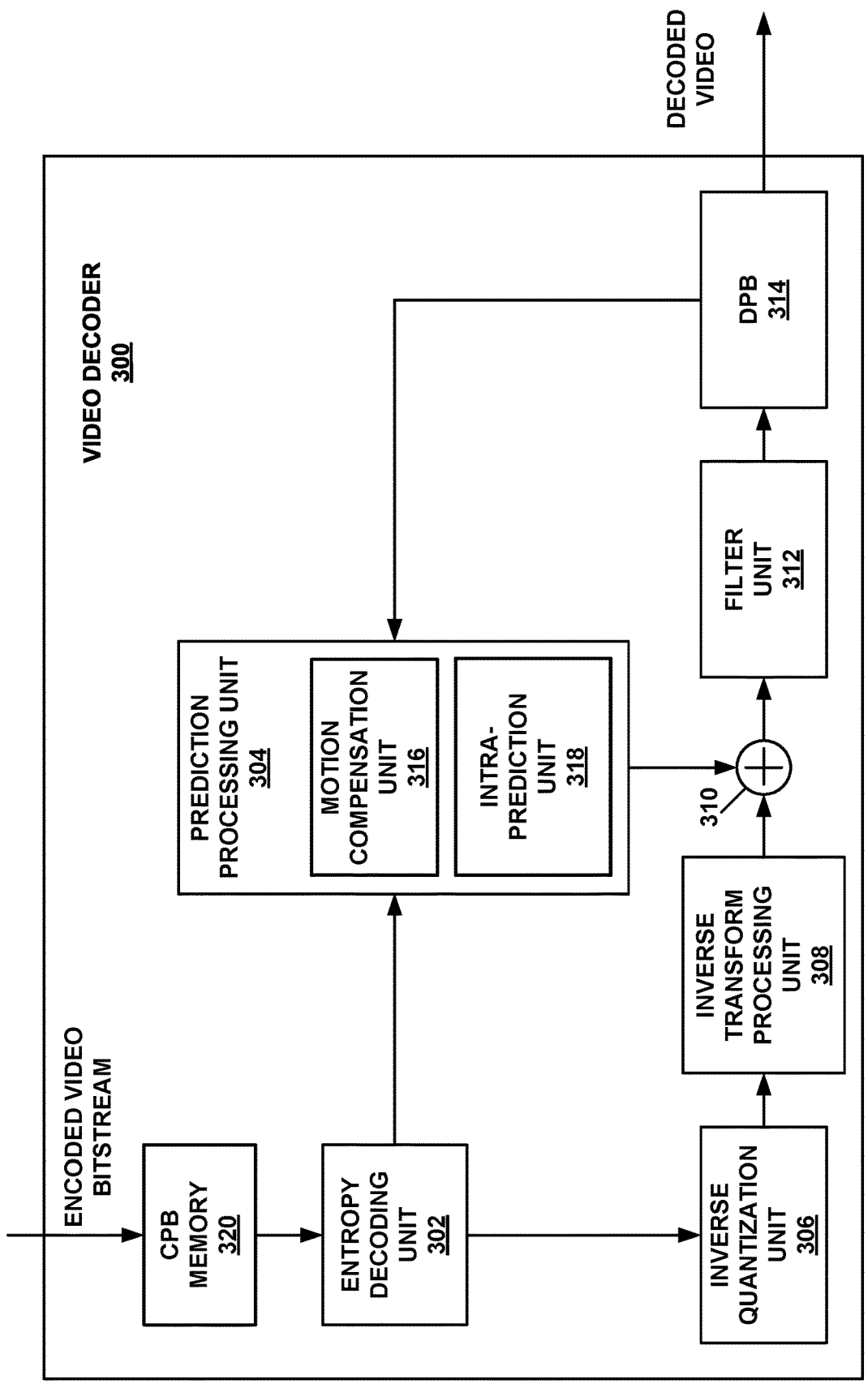
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

In some examples according to the techniques of this disclosure, entropy decoding unit 302 may determine whether to picture header information is included in a slice header of a slice of a picture. For example, entropy decoding unit 302 may decode data indicating whether adaptive loop filter (ALF) information, along with other picture header information, can be signaled in a picture header of the picture and cannot be signaled in slice headers of any slices of the picture. Entropy decoding unit 302 may decode a value of a syntax element, such as a pps_alf_info_in_ph_flag syntax element of a picture parameter set (PPS) to which the picture refers, to determine whether the ALF information can be present in the picture header and cannot be present in the slice headers.

After determining that ALF information can be present in the picture header and cannot be present in a slice header, entropy decoding unit 302 may determine a value for a syntax element indicating whether picture header information is signaled in slice headers of slices of the picture will not be decoded. Instead, entropy decoding unit 302 may infer that the syntax element has a value indicating that the picture header information is not signaled in the slice headers. For example, the syntax element may be a sh_picture_header_in_slice_header_flag syntax element. Similarly, entropy decoding unit 302 may determine that picture header information will not be included in any of the slice headers, and thus, may avoid decoding picture header information from any of the slice headers of slices of the picture. For example, a context free grammar (CFG) for the bitstream may indicate that certain decoded symbols of the slice header correspond to other syntax elements than the picture header information. Alternatively, when the syntax element, for example sh_picture_header_in_slice_header_flag, is present in a bit stream, the value of the syntax element shall be 0.

Entropy decoding unit 302 may further decode ALF information from the picture header. The ALF information may include, for example, ALF coefficients for the picture. As discussed in further detail below, filter unit 312 may apply the ALF information during filtering of decoded data for the picture (e.g., decoded blocks of the picture). Filter unit 312 may apply the same ALF information to the entire picture, e.g., all slices of the picture.

Entropy decoding unit 302 may also determine whether partitioning of the picture into slices is enabled. Entropy decoding unit 302 may then determine whether the picture may have multiple slices or not. In either case (i.e., whether or not slices are enabled), according to the techniques discussed above, entropy decoding unit 302 may still avoid decoding of picture header information in slice headers of the slices. In this manner, sizes of the slices may be reduced, and redundantly signaled information (e.g., picture header information signaled in slice headers) may be avoided, which may reduce signaling overhead for the picture and for each slice of the picture (when slices are enabled). In some examples, entropy decoding unit 302 may decode a value for a syntax element, such as a pps_no_pic_partition_flag of a picture parameter set (PPS) to which the picture refers, indicating whether partitioning of the picture into slices is enabled.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Entropy decoding unit 302 may be configured according to the techniques of this disclosure to decode picture header and slice header syntax structures for a picture. For example, a picture may include data referring to a corresponding picture parameter set (PPS). If the PPS includes a syntax element indicating that pictures referring to the PPS are not to be partitioned into sub-pictures or slices (e.g., pps_no_pic_partition_flag is equal to 1), entropy decoding unit 302 may avoid decoding a value for a syntax element specifying whether a picture header syntax structure is present in a slice header, and instead, infer whether the picture header syntax structure is present in the slice header. Furthermore, entropy decoding unit 302 may either decode the picture header syntax structure in the slice header, or separate from the slice header, according to the inferred value for the omitted syntax element.

Additionally or alternatively, if a picture is coded with a constraint that all slices of the picture are intra slices, video decoder 300 may avoid using the picture as a reference picture. For example, video decoder 300 may avoid storing the picture in DPB 314. Likewise, video decoder 300 may ensure that the picture includes a PPS identifier for a PPS for which pps_output_flag_present_flag is equal to zero. Accordingly, entropy decoding 302 may avoid coding (i.e., omit coding) values for ph_non_reference_picture_flag and ph_pic_output_flag.

Figure 5:
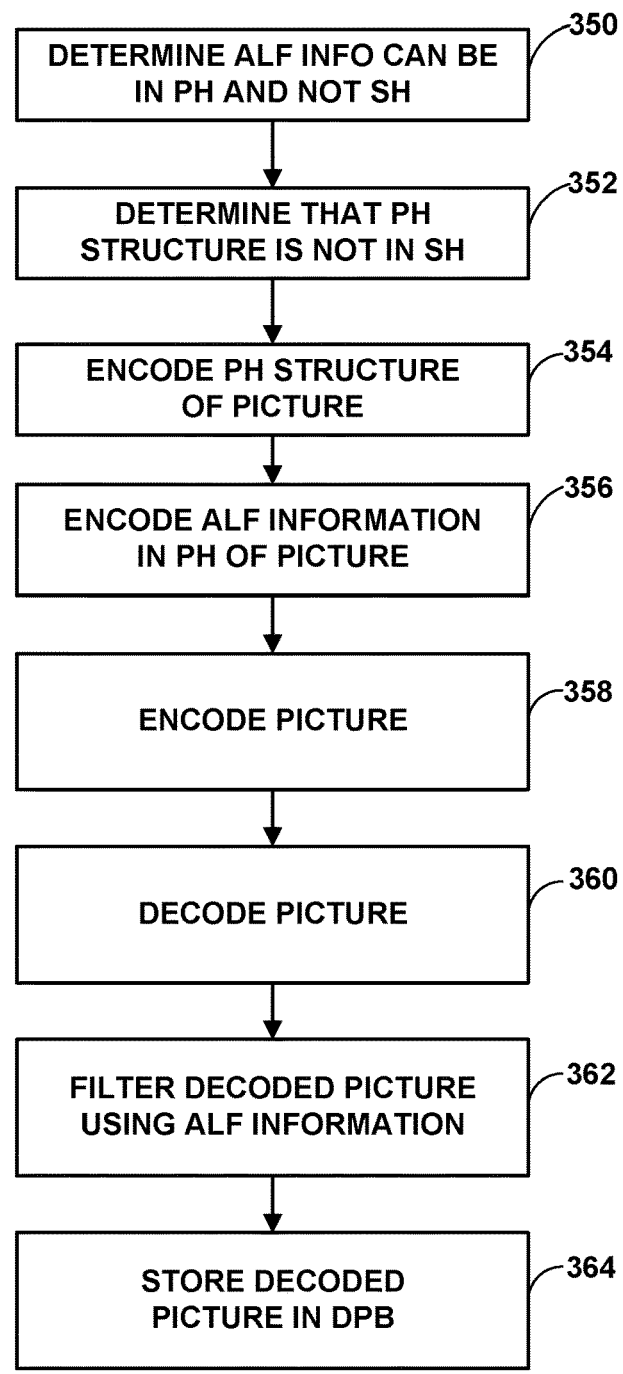
FIG. 5 is a flowchart illustrating an example method of encoding video data according to techniques of this disclosure.

FIG. 5 is a flowchart illustrating an example method of encoding video data according to techniques of this disclosure. For purposes of example, the method of FIG. 5 is explained with respect to video encoder 200 of FIGS. 1 and 3, but it should be understood that other devices may be configured to perform these or similar techniques in accordance with this disclosure.

Initially, video encoder 200 may determine that adaptive loop filter (ALF) information can be present in a picture header (PH) and cannot be present in slice headers (SH) of slices of the picture (350). For example, as discussed above, video encoder 200 may determine not to partition the picture into slices, or even when the picture is partitioned into slices, that the ALF information is the same for all slices of the picture. Further, video encoder 200 may encode a value for a syntax element indicating that the ALF information can be present in the picture header and cannot be present in the slice headers. For example, video encoder 200 may encode a value for a pps_alf_info_in_ph_flag syntax element indicating that the ALF information can be present in the picture header and cannot be present in the slice headers.

In response to determining that the ALF information can be present in the picture header and cannot be present in the slice header, video encoder 200 may determine that a picture header syntax structure is not present in the slice header (352). In particular, video encoder 200 may avoid encoding data representing a value for a syntax element indicating whether the picture header syntax structure is present in the slice header. For example, video encoder 200 may avoid encoding a value for a sh_picture_header_in_slice_header_flag syntax element. Alternatively, the syntax element sh_picture_header_in_slice_header_flag is still encoded, but the value shall be 0.

Video encoder 200 may then encode the picture header (PH) structure of the picture (354). In particular, video encoder 200 may encode the ALF information in the picture header structure of the picture (356). Video encoder 200 may also encode the picture (358), e.g., individual blocks of the picture, then decode the picture (360), and filter the decoded picture using the ALF information (362). In particular, video encoder 200 may filter the decoded picture using the same ALF information for the whole picture, thereby decoding the picture according to the picture header syntax structure (including the ALF information) in the picture header and not in the slice header. Video encoder 200 may further store the decoded picture in DPB 218 (364), e.g., for inter-prediction reference of a subsequently encoded picture.

In this manner, the method of FIG. 5 represents an example of a method of encoding and video data including determining that adaptive loop filter (ALF) information can be present in a picture header of a picture and cannot be present in a slice header; in response to determining that the ALF information can be present in the picture header and cannot be present in the slice header, determining that a picture header syntax structure is not present in the slice header (e.g., without decoding data representing a value for a syntax element indicating whether the picture header syntax structure is present in the slice header); and decoding the picture according to the determination that the picture header syntax structure is not present in the slice header.

Figure 6:
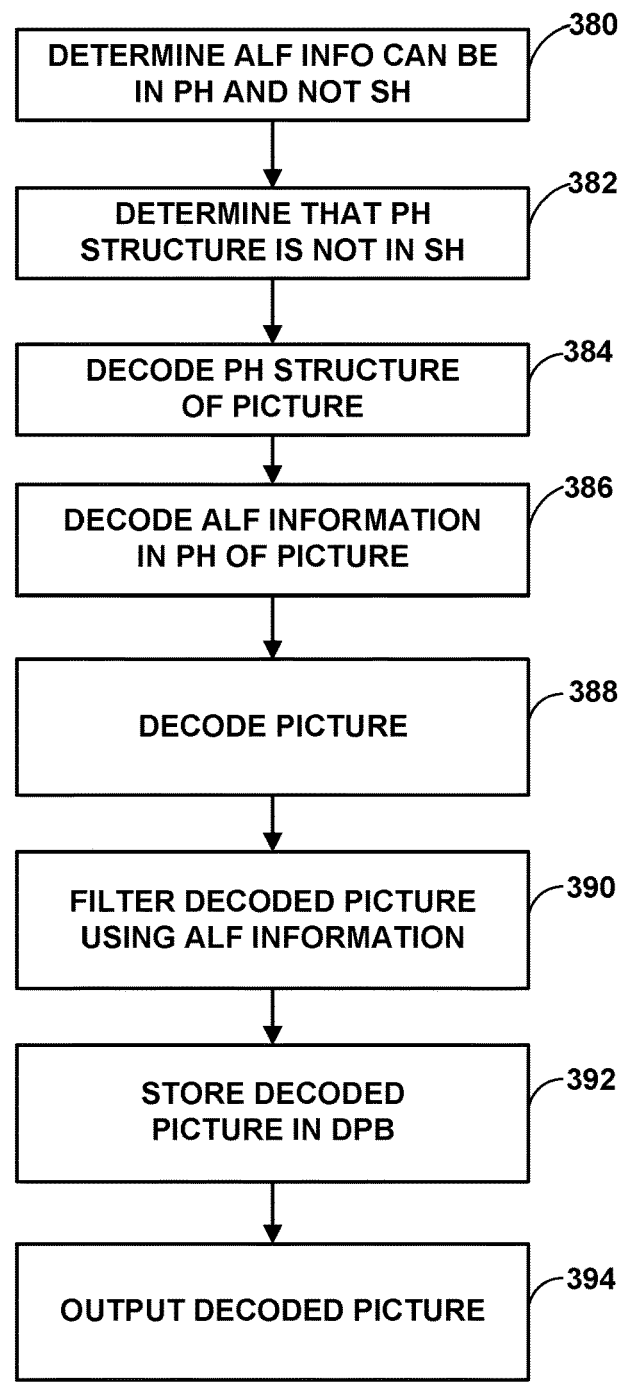
FIG. 6 is a flowchart illustrating an example method of decoding video data according to the techniques of this disclosure.

FIG. 6 is a flowchart illustrating an example method of decoding video data according to the techniques of this disclosure. For purposes of example, the method of FIG. 6 is explained with respect to video decoder 300 of FIGS. 1 and 4, but it should be understood that other devices may be configured to perform these or similar techniques in accordance with this disclosure.

Initially, video decoder 300 may determine that adaptive loop filter (ALF) information can be present in a picture header (PH) and cannot be present in slice headers (SH) of slices of the picture (380). For example, as discussed above, video decoder 300 may decode a value for a syntax element indicating that the ALF information can be present in the picture header and cannot be present in the slice headers. For example, video decoder 300 may encode a value for a pps_alf_info_in_ph_flag syntax element indicating that the ALF information can be present in the picture header and cannot be present in the slice headers. In particular, video decoder 300 may decode the pps_alf_info_in_ph_flag syntax element in a PPS to which the picture refers (i.e., the picture may include data referring to the PPS).

In response to determining that the ALF information can be present in the picture header and cannot be present in the slice header, video decoder 300 may determine that a picture header syntax structure is not present in the slice header (382). In particular, video decoder 300 may avoid decoding data representing a value for a syntax element indicating whether the picture header syntax structure is present in the slice header. For example, video decoder 300 may avoid decoding a value for a sh_picture_header_in_slice_header_flag syntax element. Video decoder 300 may also avoid decoding picture header syntax structures in slice headers, in response to determining that the picture header syntax structures are not present in the slice headers. Alternatively, when the syntax element, for example sh_picture_header_in_slice_header_flag, is present in a bit stream, the value of the syntax element shall be 0.

Video decoder 300 may then decode the picture header (PH) structure of the picture (384). In particular, video decoder 300 may decode the ALF information in the picture header structure of the picture (386). Video decoder 300 may also decode the picture (388), and filter the decoded picture using the ALF information (390). In particular, video decoder 300 may filter the decoded picture using the same ALF information for the whole picture, thereby decoding the picture according to the picture header syntax structure (including the ALF information) in the picture header and not in the slice header. Video decoder 300 may further store the decoded picture in DPB 314 (392), e.g., for interprediction reference of a subsequently decoded picture. Video decider 300 may also output the decoded picture (394).

In this manner, the method of FIG. 6 represents an example of a method of decoding video data including determining that adaptive loop filter (ALF) information can be present in a picture header of a picture and cannot be present in a slice header; in response to determining that the ALF information can be present in the picture header and cannot be present in the slice header, determining that a picture header syntax structure is not present in the slice header (e.g., without decoding data representing a value for a syntax element indicating whether the picture header syntax structure is present in the slice header); and decoding the picture according to the determination that the picture header syntax structure is not present in the slice header.

The following clauses represent certain examples of the techniques of this disclosure:

Clause 1: A method of coding video data, the method comprising: determining that partitioning of a picture into sub-pictures or slices is disabled; and in response to determining that partitioning of the picture into sub-pictures or slices is disabled, determining whether a picture header syntax structure is present in a slice header without coding data representing a value for a syntax element indicating whether the picture header syntax structure is present in the slice header; and coding the picture according to the determination of whether the picture header syntax structure is present in the slice header.

Clause 2: The method of clause 1, wherein determining that partitioning of the picture into sub-pictures or slices is disabled comprises determining that a value for a syntax element indicates that partitioning of the picture into sub-pictures or slices is disabled.

Clause 3: A method of coding video data, the method comprising: determining that partitioning of a picture into sub-pictures or slices is enabled; and in response to determining that partitioning of the picture into sub-pictures or slices is enabled, determining whether a picture header syntax structure is present in a slice header without coding data representing a value for a syntax element indicating whether the picture header syntax structure is present in the slice header; and coding the picture according to the determination of whether the picture header syntax structure is present in the slice header.

Clause 4: The method of clause 3, wherein determining that partitioning of the picture into sub-pictures or slices is enabled comprises determining that a value for a syntax element indicates that partitioning of the picture into sub-pictures or slices is enabled.

Clause 5: The method of any of clauses 2 and 4, wherein the syntax element comprises a syntax element of a picture parameter set (PPS), and wherein the picture includes data referring to the PPS.

Clause 6: The method of any of clauses 2, 4, and 5, wherein the syntax element comprises pps_no_pic_partition_flag.

Clause 7: The method of any of clauses 1-6, wherein determining whether the picture header syntax structure is present in the slice header comprises inferring that the picture header syntax structure is present in the slice header.

Clause 8: The method of clause 1-6, wherein determining whether the picture header syntax structure is present in the slice header comprises inferring that the picture header syntax structure is not present in the slice header.

Clause 9: The method of any of clauses 1-8, wherein determining whether the picture header syntax structure is present in the slice header without coding the data representing the value for the syntax element indicating whether the picture header syntax structure is present in the slice header comprises determining whether the picture header syntax structure is present in the slice header without coding the data representing the value for the syntax element indicating whether the picture header syntax structure is present in the slice header further in response to determining at least one of: that a value of a sps_subpic_info_present_flag is equal to 1; that a value of sps_separate_colour_plane_flag is equal to 1; that a value of pps_rect_slice_flag is equal to 0; or that a value of at least one of pps_rpl_info_in_ph_flag, pps_dbf_info_in_ph_flag, pps_sao_info_in_ph_flag, pps_wp_info_in_ph_flag, or pps_qp_delta_info_in_ph_flag is equal to 1.

Clause 10: The method of any of clauses 1-9, further comprising: determining that adaptive loop filter (ALF) information may be present in the picture header and not in the slice header; and in response to determining that the ALF information may be present in the picture header and not in the slice header, determining that the picture header syntax structure is not present in the slice header.

Clause 11: The method of clause 10, wherein determining that the ALF information may be present comprises determining that a pps_alf_info_in_ph_flag syntax element of a PPS to which the picture refers has a value of 1.

Clause 12: A method of coding video data, the method comprising: determining that a picture contains only intra-predicted slices of video data; in response to determining that the picture contains only intra-predicted slices, determining that the picture is not used as a reference picture; and coding the picture.

Clause 13: A method comprising the method of any of clauses 1-11 and the method of clause 12.

Clause 14: The method of any of clauses 12 and 13, wherein determining that the picture contains only intra-predicted slices comprises determining that an intra_only_constraint_flag has a value of 1.

Clause 15: The method of any of clauses 12-14, wherein determining that the picture is not used as a reference picture comprises determining a value of 1 for a ph_non_reference_picture_flag syntax element for the picture.

Clause 16: The method of any of clauses 12-15, further comprising, in response to determining that the picture contains only intra-predicted slices, preventing storage of the picture in a decoded picture buffer (DPB).

Clause 17: The method of any of clauses 12-16, further comprising, in response to determining that the picture contains only intra-predicted slices, determining a value of 0 for a pps_output_flag_present_flag for the picture.

Clause 18: The method of any of clauses 12-17, further comprising, after determining that the picture contains only intra-predicted slices, outputting the picture.

Clause 19: The method of any of clauses 12-18, further comprising, in response to determining that the picture contains only intra-predicted slices, determining a value of 1 for a ph_pic_output_flag for the picture.

Clause 20: The method of any of clauses 1-19, wherein coding comprises decoding.

Clause 21: The method of any of clauses 1-20, wherein coding comprises encoding.

Clause 22: A device for coding video data, the device comprising one or more means for performing the method of any of clauses 1-21.

Clause 23: The device of clause 22, further comprising a display configured to display decoded video data.

Clause 24: The device of clause 22, wherein the device comprises one or more of a camera, a computer, a mobile device, a broadcast receiver device, or a set-top box.

Clause 25: The device of clause 22, further comprising a memory configured to store video data.

Clause 26: A computer-readable storage medium having stored thereon instructions that, when executed, cause a processor to perform the method of any of clauses 1-21.

Clause 27: A device for coding video data, the device comprising: means for determining that partitioning of a picture into sub-pictures or slices is disabled; and means for determining, in response to determining that partitioning of the picture into sub-pictures or slices is disabled, whether a picture header syntax structure is present in a slice header without coding data representing a value for a syntax element indicating whether the picture header syntax structure is present in the slice header; and means for coding the picture according to the determination of whether the picture header syntax structure is present in the slice header.

Clause 28: A device for coding video data, the device comprising: means for determining that partitioning of a picture into sub-pictures or slices is enabled; and means for determining, in response to determining that partitioning of the picture into sub-pictures or slices is enabled, whether a picture header syntax structure is present in a slice header without coding data representing a value for a syntax element indicating whether the picture header syntax structure is present in the slice header; and means for coding the picture according to the determination of whether the picture header syntax structure is present in the slice header.

Clause 29: A device for coding video data, the device comprising: means for determining that a picture contains only intra-predicted slices of video data; means for determining, in response to determining that the picture contains only intra-predicted slices, that the picture is not used as a reference picture; and means for coding the picture.

Clause 30: A method of decoding video data, the method comprising: determining that adaptive loop filter (ALF) information can be present in a picture header of a picture and cannot be present in a slice header; in response to determining that the ALF information can be present in the picture header and cannot be present in the slice header, determining that a picture header syntax structure is not present in the slice header (e.g., without decoding data representing a value for a syntax element indicating whether the picture header syntax structure is present in the slice header); and decoding the picture according to the determination that the picture header syntax structure is not present in the slice header.

Clause 31: The method of clause 30, wherein determining that the ALF information can be present in the picture header and cannot be present in the slice header comprises determining that a value of a syntax element indicates that the ALF information can be present in the picture header and cannot be present in the slice header.

Clause 32: The method of clause 31, wherein the syntax element indicating that the ALF information can be present in the picture header and cannot be present in the slice header comprises a pps_alf_info_in_ph_flag syntax element of a picture parameter set (PPS), and wherein the picture includes data referring to the PPS.

Clause 33: The method of clause 30, wherein the syntax element indicating whether the picture header syntax structure is present in the slice header comprises a sh_picture_header_in_slice_header_flag syntax element.

Clause 34: The method of clause 30, wherein decoding the picture according to the determination that the picture header syntax structure is not present in the slice header comprises decoding the slice header of a slice of the picture without decoding one or more picture header syntax elements in the slice header.

Clause 35: The method of clause 30, wherein decoding the picture according to the determination that the picture header syntax structure is not present in the slice header comprises decoding the ALF information in the picture header, the method further comprising filtering the decoded picture using the ALF information.

Clause 36: The method of clause 30, further comprising determining that partitioning of the picture into sub-pictures or slices is enabled.

Clause 37: The method of clause 36, wherein determining that partitioning of the picture into sub-pictures or slices is enabled comprises determining that a value for a syntax element indicates that partitioning of the picture into sub-pictures or slices is enabled.

Clause 38: The method of clause 37, wherein the syntax element comprises a pps_no_pic_partition_flag of a picture parameter set (PPS), and wherein the picture includes data referring to the PPS.

Clause 39: The method of clause 30, wherein determining that the picture header syntax structure can be present in the picture header and cannot be present in the slice header comprises determining that the picture header syntax structure can be present in the picture header and cannot be present in the slice header further in response to determining at least one of: that a value of a sps_subpic_info_present_flag is equal to 1; that a value of sps_separate_colour_plane_flag is equal to 1; that a value of pps_rect_slice_flag is equal to 0; or that a value of at least one of pps_rpl_info_in_ph_flag, pps_dbf_info_in_ph_flag, pps_sao_info_in_ph_flag, pps_wp_info_in_ph_flag, or pps_qp_delta_info_in_ph_flag is equal to 1.

Clause 40: The method of clause 30, further comprising: determining that the picture contains only intra-predicted slices of video data; and in response to determining that the picture contains only intra-predicted slices, determining that the picture does not have any reference pictures; and coding the picture according to the determination that the picture does not have any reference pictures.

Clause 41: The method of clause 40, wherein determining that the picture contains only intra-predicted slices comprises determining that a syntax element representing whether the picture is only intra-predicted has a value indicating that the picture is only intra-predicted.

Clause 42: The method of clause 40, wherein determining that the picture contains only intra-predicted slices comprises determining that an intra_only_constraint_flag syntax element has a value of 1.

Clause 43: The method of clause 42, further comprising, in response to determining that the intra_only_constraint_flag syntax element has the value of 1, determining that the picture is not used as a reference picture.

Clause 44: The method of clause 42, further comprising, in response to determining that the intra_only_constraint_flag syntax element has the value of 1, preventing storage of the picture in a decoded picture buffer (DPB).

Clause 45: The method of clause 42, further comprising, in response to determining that the picture contains only intra-predicted slices: determining that a syntax element indicating whether to output the picture is not present in the picture header; and inferring that the syntax element indicating whether to output the picture has a value indicating to output the picture.

Clause 46: The method of clause 45, wherein the syntax element indicating whether to output the picture comprises a ph_pic_output_flag syntax element.

Clause 47: The method of clause 30, further comprising encoding the picture prior to decoding the picture.

Clause 48: A device for decoding video data, the device comprising: a memory configured to store video data; and one or more processors implemented in circuitry and configured to: determine that adaptive loop filter (ALF) information can be present in a picture header of a picture of the video data and cannot be present in a slice header; in response to determining that the ALF information can be present in the picture header and cannot be present in the slice header, determine that a picture header syntax structure is not present in the slice header (e.g., without decoding data representing a value for a syntax element indicating whether the picture header syntax structure is present in the slice header); and decode the picture according to the determination that the picture header syntax structure is not present in the slice header.

Clause 49: The device of clause 48, wherein to determine that the ALF information can be present in the picture header and cannot be present in the slice header, the one or more processors are configured to determine that a value of a syntax element indicates that the ALF information can be present in the picture header and cannot be present in the slice header.

Clause 50: The device of clause 49, wherein the syntax element indicating that the ALF information can be present in the picture header and cannot be present in the slice header comprises a pps_alf_info_in_ph_flag syntax element of a picture parameter set (PPS), and wherein the picture includes data referring to the PPS Clause 51: The device of clause 48, wherein the syntax element indicating whether the picture header syntax structure is present in the slice header comprises a sh_picture_header_in_slice_header_flag syntax element.

Clause 52: The device of clause 48, wherein to decode the picture according to the determination that the picture header syntax structure is not present in the slice header, the one or more processors are configured to decode the slice header of a slice of the picture without decoding one or more picture header syntax elements in the slice header.

Clause 53: The device of clause 48, wherein to decode the picture according to the determination that the picture header syntax structure is not present in the slice header, the one or more processors are configured to decode the ALF information in the picture header, and wherein the one or more processors are further configured to filter the decoded picture using the ALF information.

Clause 54: The device of clause 48, wherein the one or more processors are further configured to determine that partitioning of the picture into sub-pictures or slices is enabled.

Clause 55: The device of clause 54, wherein to determine that partitioning of the picture into sub-pictures or slices is enabled, the one or more processors are configured to determine that a value for a syntax element indicates that partitioning of the picture into sub-pictures or slices is enabled.

Clause 56: The device of clause 55, wherein the syntax element comprises a pps_no_pic_partition_flag of a picture parameter set (PPS), and wherein the picture includes data referring to the PPS.

Clause 57: The device of clause 48, wherein the one or more processors are further configured to encode the picture prior to decoding the picture.

Clause 58: The device of clause 48, further comprising a display configured to display the decoded picture.

Clause 59: The device of clause 48, wherein the device comprises one or more of a camera, a computer, a mobile device, a broadcast receiver device, or a set-top box.

Clause 60: A computer-readable storage medium having stored thereon instructions that, when executed, cause a processor to: determine that adaptive loop filter (ALF) information can be present in a picture header of a picture and cannot be present in a slice header; in response to determining that the ALF information can be present in the picture header and cannot be present in the slice header, determine that a picture header syntax structure is not present in the slice header (e.g., without decoding data representing a value for a syntax element indicating whether the picture header syntax structure is present in the slice header); and decode the picture according to the determination that the picture header syntax structure is not present in the slice header.

Clause 61: A device for decoding video data, the device comprising: means for determining that adaptive loop filter (ALF) information can be present in a picture header of a picture and cannot be present in a slice header; means for determining, in response to determining that the ALF information can be present in the picture header and cannot be present in the slice header, that a picture header syntax structure is not present in the slice header (e.g., without decoding data representing a value for a syntax element indicating whether the picture header syntax structure is present in the slice header); and means for decoding the picture according to the determination that the picture header syntax structure is not present in the slice header.

Clause 62: A method of decoding video data, the method comprising: determining that adaptive loop filter (ALF) information can be present in a picture header of a picture and cannot be present in a slice header; in response to determining that the ALF information can be present in the picture header and cannot be present in the slice header, determining that a picture header syntax structure is not present in the slice header (e.g., without decoding data representing a value for a syntax element indicating whether the picture header syntax structure is present in the slice header); and decoding the picture according to the determination that the picture header syntax structure is not present in the slice header.

Clause 63: The method of clause 62, wherein determining that the ALF information can be present in the picture header and cannot be present in the slice header comprises determining that a value of a syntax element indicates that the ALF information can be present in the picture header and cannot be present in the slice header.

Clause 64: The method of clause 63, wherein the syntax element indicating that the ALF information can be present in the picture header and cannot be present in the slice header comprises a pps_alf_info_in_ph_flag syntax element of a picture parameter set (PPS), and wherein the picture includes data referring to the PPS.

Clause 65: The method of any of clauses 62-64, wherein the syntax element indicating whether the picture header syntax structure is present in the slice header comprises a sh_picture_header_in_slice_header_flag syntax element.

Clause 66: The method of any of clauses 62-65, wherein decoding the picture according to the determination that the picture header syntax structure is not present in the slice header comprises decoding the slice header of a slice of the picture without decoding one or more picture header syntax elements in the slice header.

Clause 67: The method of any of clauses 62-66, wherein decoding the picture according to the determination that the picture header syntax structure is not present in the slice header comprises decoding the ALF information in the picture header, the method further comprising filtering the decoded picture using the ALF information.

Clause 68: The method of any of clauses 62-67, further comprising determining that partitioning of the picture into sub-pictures or slices is enabled.

Clause 69: The method of clause 68, wherein determining that partitioning of the picture into sub-pictures or slices is enabled comprises determining that a value for a syntax element indicates that partitioning of the picture into sub-pictures or slices is enabled.

Clause 70: The method of clause 69, wherein the syntax element comprises a pps_no_pic_partition_flag of a picture parameter set (PPS), and wherein the picture includes data referring to the PPS.

Clause 71: The method of any of clauses 62-70, wherein determining that the picture header syntax structure can be present in the picture header and cannot be present in the slice header comprises determining that the picture header syntax structure can be present in the picture header and cannot be present in the slice header further in response to determining at least one of: that a value of a sps_subpic_info_present_flag is equal to 1; that a value of sps_separate_colour_plane_flag is equal to 1; that a value of pps_rect_slice_flag is equal to 0; or that a value of at least one of pps_rpl_info_in_ph_flag, pps_dbf_info_in_ph_flag, pps_sao_info_in_ph_flag, pps_wp_info_in_ph_flag, or pps_qp_delta_info_in_ph_flag is equal to 1.

Clause 72: The method of any of clauses 62-71, further comprising: determining that the picture contains only intra-predicted slices of video data; and in response to determining that the picture contains only intra-predicted slices, determining that the picture does not have any reference pictures; and coding the picture according to the determination that the picture does not have any reference pictures.

Clause 73: The method of clause 72, wherein determining that the picture contains only intra-predicted slices comprises determining that a syntax element representing whether the picture is only intra-predicted has a value indicating that the picture is only intra-predicted.

Clause 74: The method of clause any of clauses 72 and 73, wherein determining that the picture contains only intra-predicted slices comprises determining that an intra_only_constraint_flag syntax element has a value of 1.

Clause 75: The method of clause 74, further comprising, in response to determining that the intra_only_constraint_flag syntax element has the value of 1, determining that the picture is not used as a reference picture.

Clause 76: The method of clause 74, further comprising, in response to determining that the intra_only_constraint_flag syntax element has the value of 1, preventing storage of the picture in a decoded picture buffer (DPB).

Clause 77: The method of any of clauses 72-76, further comprising, in response to determining that the picture contains only intra-predicted slices: determining that a syntax element indicating whether to output the picture is not present in the picture header; and inferring that the syntax element indicating whether to output the picture has a value indicating to output the picture.

Clause 78: The method of clause 77, wherein the syntax element indicating whether to output the picture comprises a ph_pic_output_flag syntax element.

Clause 79: The method of any of clauses 62-78, further comprising encoding the picture prior to decoding the picture.

Clause 80: A device for decoding video data, the device comprising: a memory configured to store video data; and one or more processors implemented in circuitry and configured to: determine that adaptive loop filter (ALF) information can be present in a picture header of a picture of the video data and cannot be present in a slice header; in response to determining that the ALF information can be present in the picture header and cannot be present in the slice header, determine that a picture header syntax structure is not present in the slice header (e.g., without decoding data representing a value for a syntax element indicating whether the picture header syntax structure is present in the slice header); and decode the picture according to the determination that the picture header syntax structure is not present in the slice header.

Clause 81: The device of clause 80, wherein to determine that the ALF information can be present in the picture header and cannot be present in the slice header, the one or more processors are configured to determine that a value of a syntax element indicates that the ALF information can be present in the picture header and cannot be present in the slice header.

Clause 82: The device of clause 81, wherein the syntax element indicating that the ALF information can be present in the picture header and cannot be present in the slice header comprises a pps_alf_info_in_ph_flag syntax element of a picture parameter set (PPS), and wherein the picture includes data referring to the PPS Clause 83: The device of any of clauses 80-82, wherein the syntax element indicating whether the picture header syntax structure is present in the slice header comprises a sh_picture_header_in_slice_header_flag syntax element.

Clause 84: The device of any of clauses 80-83, wherein to decode the picture according to the determination that the picture header syntax structure is not present in the slice header, the one or more processors are configured to decode the slice header of a slice of the picture without decoding one or more picture header syntax elements in the slice header.

Clause 85: The device of any of clauses 80-84, wherein to decode the picture according to the determination that the picture header syntax structure is not present in the slice header, the one or more processors are configured to decode the ALF information in the picture header, and wherein the one or more processors are further configured to filter the decoded picture using the ALF information.

Clause 86: The device of any of clauses 80-85, wherein the one or more processors are further configured to determine that partitioning of the picture into sub-pictures or slices is enabled.

Clause 87: The device of clause 86, wherein to determine that partitioning of the picture into sub-pictures or slices is enabled, the one or more processors are configured to determine that a value for a syntax element indicates that partitioning of the picture into sub-pictures or slices is enabled.

Clause 88: The device of clause 87, wherein the syntax element comprises a pps_no_pic_partition_flag of a picture parameter set (PPS), and wherein the picture includes data referring to the PPS.

Clause 89: The device of any of clauses 80-88, wherein the one or more processors are further configured to encode the picture prior to decoding the picture.

Clause 90: The device of any of clauses 80-89, further comprising a display configured to display the decoded picture.

Clause 91: The device of any of clauses 80-90, wherein the device comprises one or more of a camera, a computer, a mobile device, a broadcast receiver device, or a set-top box.

Clause 92: A computer-readable storage medium having stored thereon instructions that, when executed, cause a processor to: determine that adaptive loop filter (ALF) information can be present in a picture header of a picture and cannot be present in a slice header; in response to determining that the ALF information can be present in the picture header and cannot be present in the slice header, determine that a picture header syntax structure is not present in the slice header (e.g., without decoding data representing a value for a syntax element indicating whether the picture header syntax structure is present in the slice header); and decode the picture according to the determination that the picture header syntax structure is not present in the slice header.

Clause 93: A device for decoding video data, the device comprising: means for determining that adaptive loop filter (ALF) information can be present in a picture header of a picture and cannot be present in a slice header; means for determining, in response to determining that the ALF information can be present in the picture header and cannot be present in the slice header, that a picture header syntax structure is not present in the slice header (e.g., without decoding data representing a value for a syntax element indicating whether the picture header syntax structure is present in the slice header); and means for decoding the picture according to the determination that the picture header syntax structure is not present in the slice header.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that adaptive loop filter (ALF) information can be present in a picture header of a picture and cannot be present in a slice header;
    in response to determining that the ALF information can be present in the picture header and cannot be present in the slice header, determining that a picture header syntax structure is not present in the slice header without decoding data indicative of whether the picture header syntax structure is present in the slice header; and
    decoding the picture according to the determination that the picture header syntax structure is not present in the slice header.

2. The method of claim 1, wherein the data represents a value for a syntax element that indicates whether the picture header syntax structure is present in the slice header.

3. The method of claim 2, wherein determining that the ALF information can be present in the picture header and cannot be present in the slice header comprises determining that a value of a syntax element indicates that the ALF information can be present in the picture header and cannot be present in the slice header.

4. The method of claim 3, wherein the syntax element indicating that the ALF information can be present in the picture header and cannot be present in the slice header comprises a pps_alf_info_in_ph_flag syntax element of a picture parameter set (PPS), and wherein the picture includes data referring to the PPS.

5. The method of claim 1, wherein the syntax element indicating whether the picture header syntax structure is present in the slice header comprises a sh_picture_header_in_slice_header_flag syntax element.

6. The method of claim 1, wherein decoding the picture according to the determination that the picture header syntax structure is not present in the slice header comprises decoding the slice header of a slice of the picture without decoding one or more picture header syntax elements in the slice header.

7. The method of claim 1, wherein decoding the picture according to the determination that the picture header syntax structure is not present in the slice header comprises decoding the ALF information in the picture header, the method further comprising filtering the decoded picture using the ALF information.

8. The method of claim 1, further comprising determining that partitioning of the picture into sub-pictures or slices is enabled.

9. The method of claim 8, wherein determining that partitioning of the picture into sub-pictures or slices is enabled comprises determining that a value for a syntax element indicates that partitioning of the picture into sub-pictures or slices is enabled.

10. The method of claim 9, wherein the syntax element comprises a pps_no_pic_partition_flag of a picture parameter set (PPS), and wherein the picture includes data referring to the PPS.

11. The method of claim 1, wherein determining that the picture header syntax structure can be present in the picture header and cannot be present in the slice header comprises determining that the picture header syntax structure can be present in the picture header and cannot be present in the slice header further in response to determining at least one of:
    that a value of a sps_subpic_info_present_flag is equal to 1;
    that a value of sps_separate_colour_plane_flag is equal to 1;
    that a value of pps_rect_slice_flag is equal to 0; or
    that a value of at least one of pps_rpl_info_in_ph_flag, pps_dbf_info_in_ph_flag, pps_sao_info_in_ph_flag, pps_wp_info_in_ph_flag, or pps_qp_delta_info_in_ph_flag is equal to 1.

12. The method of claim 1, further comprising:
    determining that the picture contains only intra-predicted slices of video data; and
    in response to determining that the picture contains only intra-predicted slices, determining that the picture does not have any reference pictures; and
    coding the picture according to the determination that the picture does not have any reference pictures.

13. The method of claim 12, wherein determining that the picture contains only intra-predicted slices comprises determining that a syntax element representing whether the picture is only intra-predicted has a value indicating that the picture is only intra-predicted.

14. The method of claim 12, wherein determining that the picture contains only intra-predicted slices comprises determining that an intra_only_constraint_flag syntax element has a value of 1.

15. The method of claim 14, further comprising, in response to determining that the intra_only_constraint_flag syntax element has the value of 1, determining that the picture is not used as a reference picture.

16. The method of claim 14, further comprising, in response to determining that the intra_only_constraint_flag syntax element has the value of 1, preventing storage of the picture in a decoded picture buffer (DPB).

17. The method of claim 12, further comprising, in response to determining that the picture contains only intra-predicted slices:
    determining that a syntax element indicating whether to output the picture is not present in the picture header; and
    inferring that the syntax element indicating whether to output the picture has a value indicating to output the picture.

18. The method of claim 17, wherein the syntax element indicating whether to output the picture comprises a ph_pic_output_flag syntax element.

19. The method of claim 1, further comprising encoding the picture prior to decoding the picture.

20. A device for decoding video data, the device comprising:
    a memory configured to store video data; and
    one or more processors implemented in circuitry and configured to:
        determine that adaptive loop filter (ALF) information can be present in a picture header of a picture of the video data and cannot be present in a slice header;
        in response to determining that the ALF information can be present in the picture header and cannot be present in the slice header, determine that a picture header syntax structure is not present in the slice header without decoding data indicative of whether the picture header syntax structure is present in the slice header; and
        decode the picture according to the determination that the picture header syntax structure is not present in the slice header.

21. The device of claim 20, wherein the data represents a value for a syntax element that indicates whether the picture header syntax structure is present in the slice header.

22. The device of claim 21, wherein to determine that the ALF information can be present in the picture header and cannot be present in the slice header, the one or more processors are configured to determine that a value of a syntax element indicates that the ALF information can be present in the picture header and cannot be present in the slice header.

23. The device of claim 22, wherein the syntax element indicating that the ALF information can be present in the picture header and cannot be present in the slice header comprises a pps_alf_info_in_ph_flag syntax element of a picture parameter set (PPS), and wherein the picture includes data referring to the PPS.

24. The device of claim 20, wherein the syntax element indicating whether the picture header syntax structure is present in the slice header comprises a sh_picture_header_in_slice_header_flag syntax element.

25. The device of claim 20, wherein to decode the picture according to the determination that the picture header syntax structure is not present in the slice header, the one or more processors are configured to decode the slice header of a slice of the picture without decoding one or more picture header syntax elements in the slice header.

26. The device of claim 20, wherein to decode the picture according to the determination that the picture header syntax structure is not present in the slice header, the one or more processors are configured to decode the ALF information in the picture header, and wherein the one or more processors are further configured to filter the decoded picture using the ALF information.

27. The device of claim 20, wherein the one or more processors are further configured to determine that partitioning of the picture into sub-pictures or slices is enabled.

28. The device of claim 27, wherein to determine that partitioning of the picture into sub-pictures or slices is enabled, the one or more processors are configured to determine that a value for a syntax element indicates that partitioning of the picture into sub-pictures or slices is enabled.

29. The device of claim 28, wherein the syntax element comprises a pps_no_pic_partition_flag of a picture parameter set (PPS), and wherein the picture includes data referring to the PPS.

30. The device of claim 20, wherein the one or more processors are further configured to encode the picture prior to decoding the picture.

31. The device of claim 20, further comprising a display configured to display the decoded picture.

32. The device of claim 20, wherein the device comprises one or more of a camera, a computer, a mobile device, a broadcast receiver device, or a set-top box.

33. A non-transitory, computer-readable storage medium having stored thereon instructions that, when executed, cause a processor to:
    determine that adaptive loop filter (ALF) information can be present in a picture header of a picture and cannot be present in a slice header;
    in response to a determination that the ALF information can be present in the picture header and cannot be present in the slice header, determine that a picture header syntax structure is not present in the slice header without decoding data indicative of whether the picture header syntax structure is present in the slice header; and
    decode the picture according to the determination that the picture header syntax structure is not present in the slice header.

34. A device for decoding video data, the device comprising:
    means for determining that adaptive loop filter (ALF) information can be present in a picture header of a picture and cannot be present in a slice header;
    means for determining, in response to determining that the ALF information can be present in the picture header and cannot be present in the slice header, that a picture header syntax structure is not present in the slice header without decoding data indicative of whether the picture header syntax structure is present in the slice header; and
    means for decoding the picture according to the determination that the picture header syntax structure is not present in the slice header.

* * * * *